United States Patent [19]
Sakamoto et al.

[11] Patent Number: 6,043,480
[45] Date of Patent: Mar. 28, 2000

[54] LIGHT MEASURING DEVICE CAPABLE OF MEASURING OPTICAL POWER LEVEL EASILY WITH HIGH ACCURACY

[75] Inventors: Takashi Sakamoto; Keita Katoh, both of Atsugi, Japan

[73] Assignee: Anritsu Corporation, Tokyo, Japan

[21] Appl. No.: 09/088,914

[22] Filed: Jun. 2, 1998

[30] Foreign Application Priority Data

Jun. 6, 1997 [JP] Japan ................................ 9-149463

[51] Int. Cl.[7] .................................................. H01J 40/14
[52] U.S. Cl. ...................... 250/214 A; 356/218; 356/222
[58] Field of Search ............................ 250/205, 214 A; 356/218, 222, 226, 229

[56] References Cited

U.S. PATENT DOCUMENTS

| | | | |
|---|---|---|---|
| 3,581,643 | 6/1971 | Yoshimura | 356/226 |
| 3,687,558 | 8/1972 | Rex | 356/218 |
| 4,927,266 | 5/1990 | Sugiura et al. | 250/205 |

*Primary Examiner*—Stephone B. Allen
*Attorney, Agent, or Firm*—Frishauf, Holtz, Goodman, Langer & Chick, P.C.

[57] ABSTRACT

To measure the optical power level of light from an object to be measured, a bias section applies to a photo-detecting section such a reverse bias voltage as makes the current multiplication factor M almost zero to prevent the output current from flowing, and then applies such a reverse bias voltage as makes the M one or more to allow the output current to flow. A processing section determines an offset level from the output of a direct-current amplifying section during an offset data acquisition period that the M is almost zero. The time T0 from when the bias section applies to the photo-detecting section such a reverse bias voltage as makes the M one or more to when the reverse bias voltage is applied to make the M almost zero is determined to be a measurement state. The processing section measures the optical power with a clock faster than time T0. The processing section subtracts the offset level from the measured optical power level to compensate for the offset, thereby determining the correct optical power level of the measured object. This makes it possible to automatically perform offset compensation without shading light before measurement and realize highly accurate measurement.

5 Claims, 6 Drawing Sheets

LIGHT MEASURING DEVICE CAPABLE OF MEASURING OPTICAL POWER LEVEL EASILY WITH HIGH ACCURACY

BACKGROUND OF THE INVENTION

This invention relates to a light measuring device, and more particularly to a light measuring device capable of measuring the power level of incident light.

In a light measuring device, such as an optical power meter, for measuring the power level of the incident light from an object to be measured, such as a light source or an optical transmission device externally connected to a photo-detecting system, the offset level of the photo-detecting system (e.g., an amplifier) must be compensated for.

Here, the offset level is defined as the output level of the photo-detecting system on which no light from the object to be measured is projected.

The accurate optical power of light from the measured object can be calculated by subtracting the offset level from the output level of the photo-detecting system on which the light from the measured object has been projected.

The subtraction process is called offset compensation.

In the case of conventional light measuring devices, before optical power is measured, offset compensation is made according to the following procedure.

First, a shade cover is put on the connector section of the light measuring device to which an object to be measured is connected.

Then, the output level of the light measuring device whose connector section has not been struck by light is measured and the measured level is determined to be the offset level.

Thereafter, the shade cover is removed and an object to be measured is connected to the connector section of the light measuring device. Then, the light from the object is allowed to strike the connector section.

Then, the previously determined offset level is subtracted from the level of the light sensed by the photo-detecting system of the light measuring device at that time. In this way, the resulting level is measured as the optical power level of light from the measured object.

The offset compensation is made periodically to reduce measurement errors.

With the conventional light measuring devices, however, light must be shaded to make the above-described offset compensation. This requires the laborious task of putting a shade cover on the connector section before measurement, measuring the offset level, removing the shade cover, connecting an object to be measured to the connector section of the light measuring device, and making the desired measurement.

Furthermore, the conventional light measuring devices prevent the desired measuring operation from being started immediately.

The causes of preventing the offset level from decreasing to zero with the conventional light measuring devices are roughly divided into the following two factors:

1. dark current in the photo-detecting element
2. a direct-current amplifier connected to the photo-detecting element The inventors of the specification have considered the effect of factor 1 on the measurement result.

FIG. 2 shows a characteristic of the output current, dark current, and current multiplication factor of an InGaAs APD (Avalanche Photodiode) versus reverse voltage.

In FIG. 2, when the optical power of the measured object is measured (with a reverse bias at a multiplication factor of about one), a dark current of about $10^{-10}$ A is generated.

The dark current is added to the received-light current caused by the light from the measured object. The APD outputs the resulting current.

FIG. 3 shows the calculated measurement error by the dark current in this condition corresponding to the optical power.

It is seen from FIG. 3 that if the optical power is in the range down to about −50 dBm, measurements can be made with an error of less than 0.05 dB.

Therefore, as shown in FIG. 3, when optical power is measured in the range down to −50 dBm, the necessity for compensating for the offset level due to factor 1 is small. As a result, only the offset level due to factor 2 has only to be compensated for.

One known light measuring device is an OTDR (an Optical Time Domain Reflectometer), which throws light pulse on a fiber to be measured, processes the reflected light (back scattering light or Fresnel reflected light) from the measured fiber as a result of the supply of the light pulse, and measures losses or defective points in the measured fiber.

FIG. 6 shows a general configuration of an OTDR of this type.

The OTDR comprises a timing generator section 21, a light pulse emitting section 22, a branch section 23, a photo-detecting section 24, a direct-current amplifying section 25, an A/D conversion section 26, a processing section 27, and a display section 28.

In the OTDR, on the basis of the control signal from the processing section 27, the timing generator section 21 outputs a signal to the light pulse emitting section 22 in a period corresponding to the length of a fiber 29 to be measured, that is, in the period T longer than time t required for the reflected light to come back the total length of the fiber 29 since the supply of the light pulse to the fiber 29.

Receiving the output, the light pulse generator section 22 generates a light pulse in each period T.

The light pulse generated in each period T by the light pulse generator section 22 is allowed to input the fiber 29 via the branch section 23.

The reflected light returning from the fiber 29 as a result of the supply of the light pulse is allowed to input the photo-detecting section 24 via the branch section 23, which converts the light into electricity.

The photoelectrically converted signal is converted by the A/D converter section 26 into a digital signal. The digital signal is inputted to the processing section 27.

The processing section 27 performs the process of logarithmically converting the inputted digital signal by sampling the data.

On the basis of the signal processing, a waveform is displayed on the display section 28.

With the OTDR of this type, a light pulse is thrown to the fiber 29 in each period T (e.g., at intervals of one msec).

Of an N number of (e.g., 5000) data items sampled during one period T, the average value of an M number of (e.g., 20) data items not containing the reflected light from the fiber 29 is determined to be the offset level.

Then, offset compensation is made by subtracting the offset level from each of the N number of data items sampled.

Recent OTDRs are required to have the function of measuring the power level of the incident light from the object, such as a light source or a light transmission device.

In the case of a configuration realizing such a function, the received-light power level of incident light is measured without using a light pulse from the light pulse emitting section 22.

For this reason, with the configuration realizing the above-described function, offset compensation for the photo-detecting system must be made in the OTDR as in generally used light measuring devices.

BRIEF SUMMARY OF THE INVENTION

From the above consideration and analysis, it has become clear that if optical power is in the range down to about −50 dBm, the received-light power level of the incident light from an object to be measured can be measured with sufficient accuracy by compensating for only the offset level due to the factor 2 which is aforementioned.

It is, accordingly, an object of the present invention to solve the problem of the above-described prior art by providing a light measuring device capable of easily measuring, with high accuracy, the received-light power level of light from an object to be measured by effecting offset compensation without shading light before measurement as in the prior art.

According to the present invention, there is provided a light measuring device comprising: a photo-detecting section whose output current varies according to an applied reverse bias voltage and which receives light from a measured object and outputs a current proportional to the intensity of the light; a bias section which generates a first reverse voltage to prevent the output current of the photo-detecting section from flowing and a second reverse bias voltage to allow the output current of the photo-detecting section to flow and applies the first reverse bias voltage and the second reverse bias voltage to the photo-detecting section; a direct-current amplifying section which outputs a signal whose level is proportional to the output current from the photo-detecting section; and a processing section which determines the intensity of light from the measured object from a first output from the direct-current amplifying section when the bias section is controlled so that the first reverse bias voltage may be applied to the photo-detecting section and a second output from the direct-current amplifying section when the bias section is controlled so that the second reverse bias voltage may be applied to the photo-detecting section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinbefore.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1A:
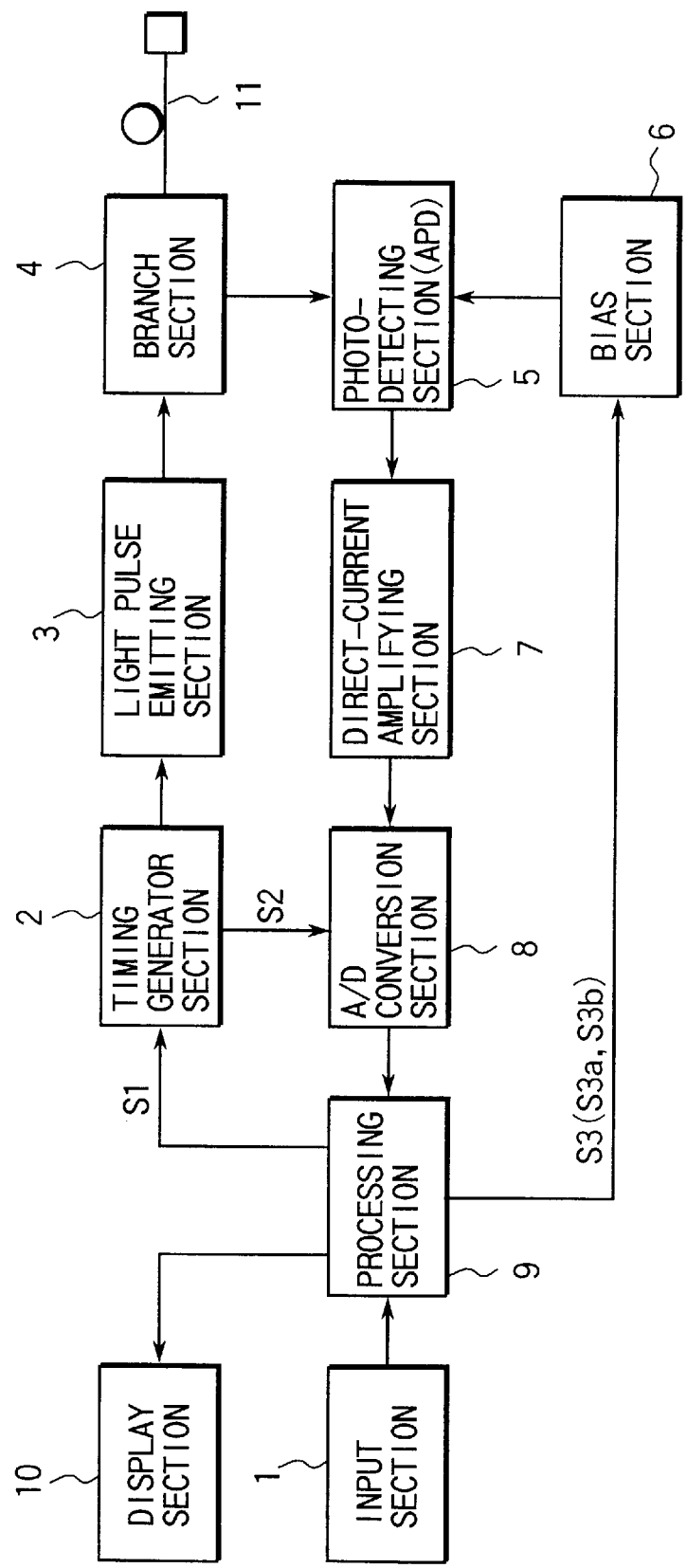
FIG. 1A is a block diagram of a light measuring device according to a first embodiment of the present invention.

Reference will not be made in detail to the presently preferred embodiments of the invention as illustrated in the accompanying drawings, in which like reference characters designate like or corresponding parts throughout the several drawings.

An outline of a light measuring device according to the present invention will be explained by reference to FIG. 1A.

In the knowledge that if optical power is in the range down to about −50 dBm, the power level of the incident light from an object to be measured can be measured with sufficient accuracy by compensating for only the offset level due to the factor 2 which is aforementioned, light measuring devices according to the present invention have the following configurations.

A light measuring device according to the first aspect of the present invention is characterized by comprising: a photo-detecting section 5 whose output current varies with an applied reverse bias voltage and which receives light from an object to be measured; a bias section 6 which applies a reverse bias voltage to the photo-detecting section in such a manner that the bias voltage can vary; a direct-current amplifying section which outputs a signal whose level is proportional to the output current from the photo-detecting section; and means 8 and 9 which determine a first output level outputted from the direct-current amplifying section when the bias section applies the reverse bias voltage to the photo-detecting section to prevent the output current from flowing, determine a second output level outputted from the direct-current amplifying section when the bias section applies the reverse bias voltage to the photo-detecting section to allow the output current to flow, and determine the optical power level of the object by subtracting the first output level from the second output level to compensate for an offset.

A light measuring device according to the second aspect of the present invention is characterized in that in the light measuring device according to the first aspect of the present invention, the bias section 6 applies to the photo-detecting section such a reverse bias voltage as makes the current multiplication factor of the photo-detecting section almost zero to prevent the output current of the photo-detecting section 5 from flowing and applies to the photo-detecting section such a reverse bias voltage as makes the current multiplication factor of the photo-detecting section one or more to allow the output current of the photo-detecting section 5 to flow to enable the measurement of the optical power level of the measured object.

In the light measuring device of the present invention, means 8 and 9 determine the first output level outputted from the direct-current amplifying section 7 when the bias section 6 applies a reverse bias voltage to the photo-detecting section 5 to prevent the output current of the photo-detecting section 5 from flowing.

Furthermore, the means 8 and 9 determine the second output level outputted from the direct-current amplifying section 7 when the bias section 6 applies a reverse bias voltage to the photo-detecting section 5 to allow the output current of the photo-detecting section 5 to flow.

Then, the means 8 and 9 determine the optical power level of the object by subtracting the first output level from the second output level to compensate for the offset.

Accordingly, with the present invention, it is possible to provide a light measuring device capable of easily measuring the power level of the incident light from the measured object with high accuracy by performing offset compensation without shading light before measurement as in the prior art.

Embodiments according to the present invention as described above will be explained by reference to the accompanying drawings.

FIG. 1A is a block diagram of a light measuring device according to a first embodiment of the present invention.

As shown in FIG. 1A, the light measuring device comprises an input section 1, a timing generator section 2, a light pulse emitting section 3, a branch section 4, a photo-detecting section 5, a bias section 6, a direct-current amplifying section 7, an A/D conversion section 8, a processing section 9, and a display section 10.

The input section 1 has a fiber measuring mode and an optical power level measuring mode and chooses one of these modes as a result of key operation.

The input section 1 outputs the signal corresponding to the chosen mode to the processing section 9 as described later.

The input section 1 also outputs the various measuring parameters necessary for signal processing to the processing section 9.

On the basis of a control signal Si from the processing section 9, the timing generator section 2 outputs a timing signal S2 to the light pulse emitting section 3 and A/D conversion section 8.

Being triggered by the timing signal S2 from the timing generator section 2, the light pulse emitting section 3 outputs a light pulse in a long wavelength band of, for example, 1.3 $\mu$m or 1.55 $\mu$m.

The light pulse from the light pulse emitting section 3 is emitted via the branch section 4 to the measured fiber 11 in the period corresponding to the length of the fiber 11, that is, in the period T longer than time t required for the reflected light to come back the total length of the fiber 11 since the supply of the light pulse to the fiber 11.

The branch section 4 is composed of, for example, a directional optical coupler and branches to the side of the photo-detecting section 5 the reflected light (back scattering light or Fresnel reflected light) from the fiber 11 as a result from the supply of light pulse in the fiber measuring mode or the incident light from the object to be measured, such as a light source or an optical transmission, in the power level measuring mode.

The photo-detecting section 5 is composed of, for example, InGaAs APD, and has the function of amplifying electrons or holes created by the incident light at a specific current multiplication factor.

The photo-detecting section 5 senses not only the reflected light from the fiber 11 separated by the branch section 4 in the fiber measuring mode but also the incident light from the measured object in the optical power level measuring mode.

The current multiplication factor M of the photo-detecting section 5 is changed according to the level of the reverse bias voltage applied by the bias section 6.

Figure 2:
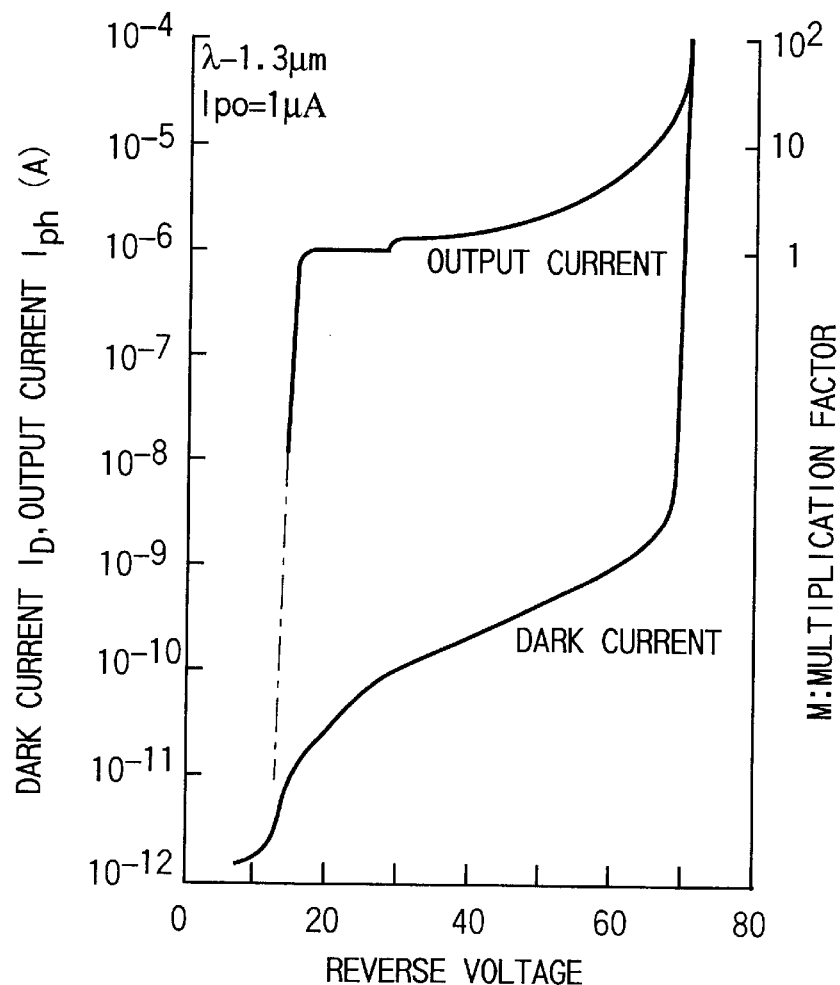
FIG. 2 shows a current versus reverse voltage characteristic of an InGaAs APD used as the photo-detecting section of the light measuring device of the first embodiment.
Figure 3:
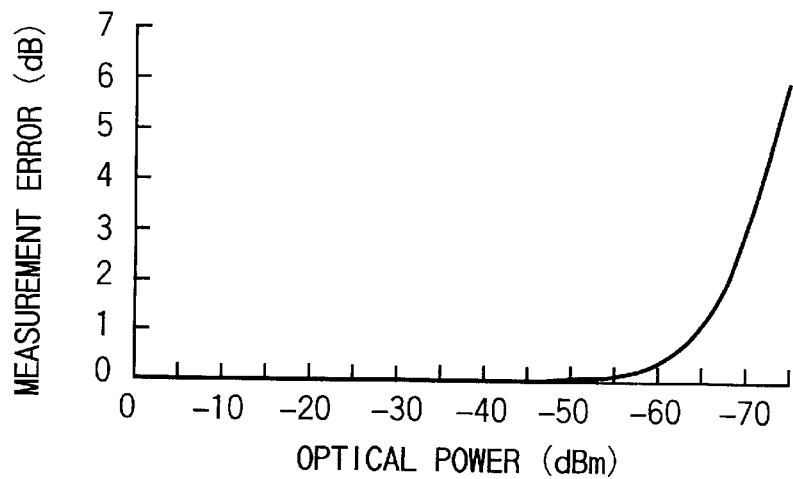
FIG. 3 shows an example of the calculated measurement error by the dark current of the InGaAs APD corresponding to the optical power of an object to be measured.

An InGaAs APD having a characteristic of the output current, dark current, and current multiplication factor versus the reverse voltage shown in FIG. 2 is used as the photo-detecting section 5.

When the InGaAs APD is used, it is evident from FIG. 2 that as the reverse bias voltage is made closer to 0 V, the output current scarcely flows and the dark current also decreases.

Namely, when the InGaAs APD is used, making the reverse bias voltage closer to 0 V makes the current multiplication factor M of the photo-detecting section 5 almost 0.

In this case, the offset due to the dark current in the photo-detecting section 5 has a negligible value as analyzed in BACKGROUND OF THE INVENTION.

In FIG. 2, the fact that making the current multiplication factor M closer to 0 decreases the dark current of the APD means that it can not be compensated the offset level due to factor 1 which is aforementioned.

The photo-detecting section 5 is not restricted to the InGaAs APD and may be any suitable device, provided that the variation of the reverse bias voltage allows almost no output current of the device to flow.

On the basis of a control signal S3 from the processing section 9, the bias section 6 applies a specific reverse bias voltage to the photo-detecting section 5.

More specifically, when an InGaAs APD is used as the photo-detecting section 5, the bias section 6, receiving a control signal S3$a$ for an offset compensation instruction from the processing section 9, applies to the photo-detecting section 5 such a reverse bias voltage (e.g., in the rage of 0 V or higher and 13 V or lower) as makes the current multiplication factor M almost 0 at which almost no current flows in the photo-detecting section 5.

In contrast, when receiving a control signal S3$b$ for a measurement instruction from the processing section 9, the bias section 6 applies to the photo-detecting section 5 such a reverse bias voltage (e.g., in the range of 16 V or higher and 100 V or lower) as makes the current multiplication factor M meet M$\geq$1 to measure the incident light from the measured object.

The direct-current amplifying section 7 amplifies the output current from the photo-detecting section 5 at a specific multiplication factor and outputs the result to the A/D conversion section 8.

More specifically, the direct-current amplifying section 7 is composed of, for example, a current-voltage converter and a voltage amplifier. In the direct-current amplifying section 7, the current-voltage converter converts the current signal outputted from the cathode of the photo-detecting section 5 into a voltage signal. The voltage amplifier then amplifies the converted voltage signal at a specific multiplication factor.

At that time, the multiplication factor of the voltage amplifier in the direct-current amplifying section 7 is varied by the control signal from the processing section 9.

In the fiber measuring mode, being triggered by the timing signal S2 from the timing generator section 2, the A/D conversion section 8 samples the signal amplified at the direct-current amplifying section 7 in a specific sampling period and digitizes the sampled signal. Then, the A/D conversion section outputs the sampled digital signal to the processing section 9.

Furthermore, in the optical power level measuring mode, the A/D conversion section 8 converts the signal amplified at the direct-current amplifying section 7 into a digital signal and outputs it to the processing section 9.

The processing section 9 performs the process of logarithmically converting the sampling signal from the A/D conversion section 8 in the fiber measuring mode.

Each data item obtained from the signal processing is displayed as, for example, waveform data, on the display section 10, such as a CRT display.

Furthermore, the processing section 9 performs the process of calculating an optical power level from the digital signal from the A/D conversion section 8 in the optical power level measuring mode.

The data on the optical power level obtained by the calculation process is displayed on the display section 10.

Moreover, on the basis of the input signal from the input section 1, the processing section 9 outputs control signals S1 and S3 (S3a and S3b) to the timing generator section 2 and the bias section 6.

More specifically, the processing section 9 is composed of, for example, a CPU, and has a timer circuit in it. When the optical power level measuring mode is set, the processing section 9 outputs the control signal S3a indicating an offset instruction to the bias section 6 each time the time set in the timer circuit has elapsed.

When not outputting the control signal S3a indicating an offset compensation instruction, the processing section 9 outputs the control signal indicating a measurement instruction to the bias section 6.

At that time, when the fiber measuring mode is chosen from the input section 1, the processing section 9 outputs the control signal S1 instructing the timing generator section 2 to emit a light pulse.

Figure 4:
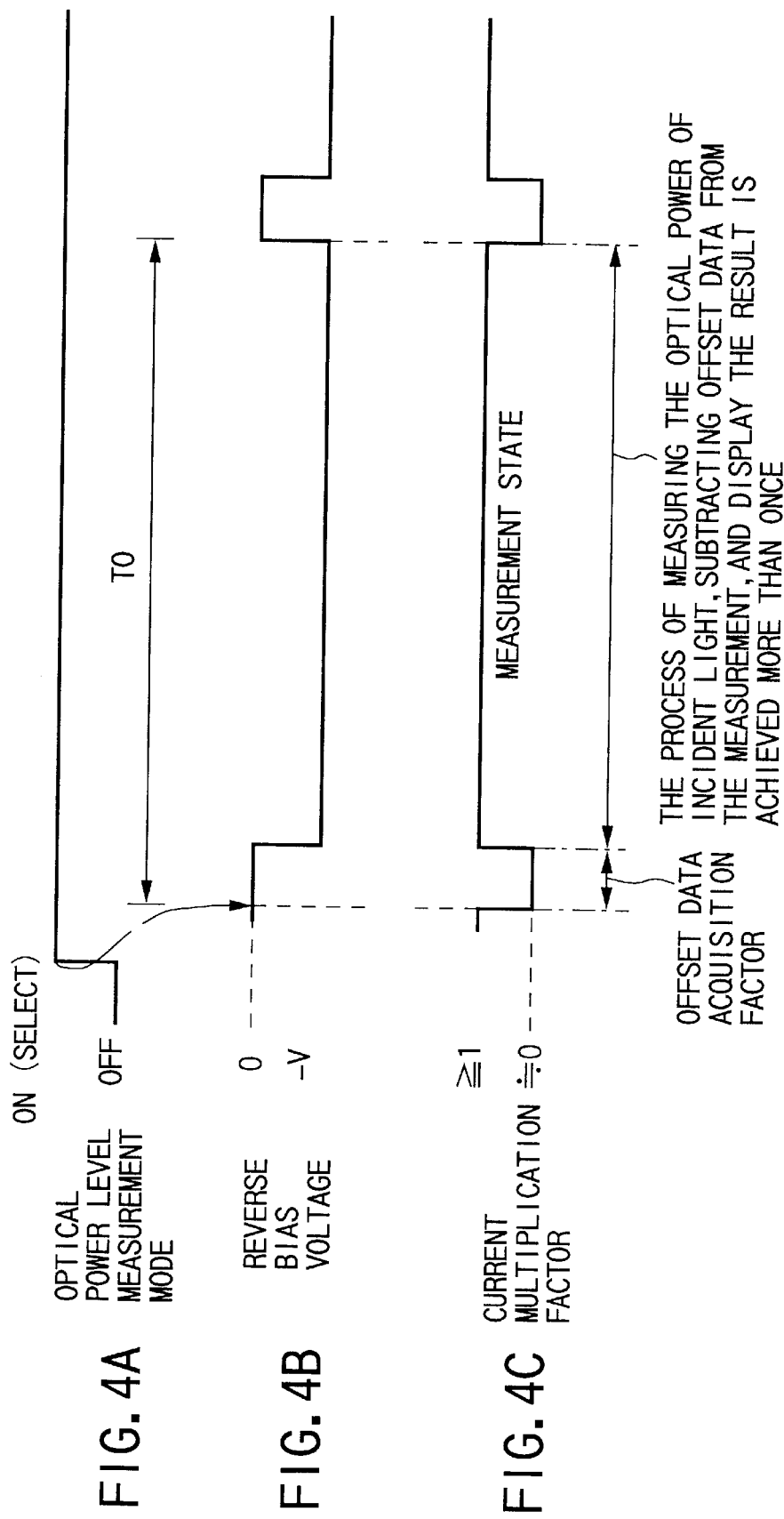
FIGS. 4A, 4B, and 4C are timing charts to help explain the offset compensation operation in the light measuring device of the first embodiment.

A series of operations including offset compensation for the light measuring device constructed described above will be described by reference to timing charts as shown in FIGS. 4A, 4B, and 4C.

After the power switch (not shown) has been turned on to start the light measuring device, when the optical power level measuring mode is chosen from the input section 1, the light pulse emitting section 3 is prevented from emitting a light pulse and the incident light from the object to be measured is thrown to the photo-detecting section 5. Then, the photo-detecting section 5 performs photoelectric conversion.

At that time, the processing section 9 outputs control signal S3a indicating an offset compensation instruction to the bias section 6.

When receiving control signal S3a from the processing section 9, the bias section 6 applies to the photo-detecting section 5 such a bias voltage (0) as makes the current multiplication factor M of the photo-detecting section 5 almost 0.

This allows almost no output current to flow in the photo-detecting section 5.

At that time, the output, including dark current, of the photo-detecting section 5 is amplified at the direct-current amplifying section 7 and then, together with the offset voltage from the direct-current amplifying section 7, is converted into a digital signal at the A/D conversion section 8. The digital signal is then inputted to the processing section 9 as offset data in the optical power level measuring mode.

The offset data is stored in, for example, a memory (not shown) within the processing section 9.

As shown in FIGS. 4A, 4B, and 4C, the time from when such a bias voltage (0) as makes the current multiplication factor M of the photo-detecting section 5 almost 0 is applied until such a bias voltage (−V) as makes the current multiplication factor M of the photo-detecting section 5 meet $M \geq 1$ is applied is determined to be an offset data acquisition period.

When receiving control signal S3b indicting a measurement instruction from the processing section 9, the bias section 6 applies to the photo-detecting section 5 such a bias voltage (−V) as makes the current multiplication factor M of the photo-detecting section 5 meet $M \geq 1$ to bring the photo-detecting section 5 into the measurement state.

The output current from the photo-detecting section 5 is converted into a voltage and the voltage result is amplified at the direct-current amplifying section 7.

Then, the signal amplified at the direct-current amplifying section 7, together with the offset voltage from the direct-current amplifying section 7, is converted into a digital signal at the A/D conversion section 8. The digital signal is then inputted to the processing section 9.

The processing section 9 performs offset compensation by subtracting the offset data measured and stored at the time of the preceding offset compensation instruction (that is, when the current multiplication factor M of the photo-detecting section 5 meets $M \neq 0$) from the data of the digital signal inputted at that time.

The level of the data after the offset compensation is the correct optical power level of the measured object.

As shown in FIGS. 4A, 4B, and 4C, the time from when such a bias voltage (−V) as makes the current multiplication factor M of the photo-detecting section 5 meet $M \geq 1$ is applied until such a bias voltage (0) as makes the current multiplication factor M of the photo-detecting section 5 almost 0 is applied is determined to be allocated to the measurement state.

While the optical power level measuring mode is being chosen, the offset data when the current multiplication factor M of the photo-detecting section 5 becomes almost 0 is acquired repeatedly at intervals of time T0.

Within time T0, the optical power of the incident light when the current multiplication factor M of the photo-detecting section 5 meets $M \geq 1$ is measured more than once with a faster clock than T0.

Then, the already acquired offset data is subtracted from each measurement data item and the level after the subtraction is displayed.

This reduces the number of times the offset data is acquired to only once, while the processing section 9 measures and displays the optical power of the incident light more than once (for example, 50 times) during time T0.

The relationship between the measurement and display of the optical power of the incident light and the acquisition of the offset data depends on the temperature in an environment where the device is used.

For example, when the temperature varies fast, time T0 should be set shorter to acquire the offset data at shorter intervals.

Accordingly, with the first embodiment, simply turning on the power supply enables the necessary offset compensation in the optical power level measuring mode to be made automatically at regular intervals of time.

At that time, as the reverse bias voltage applied to the photo-detecting section 5 is closer to 0, errors in measurement decrease more.

Offset compensation in the first embodiment can be made even when no light is incident on the photo-detecting section 5.

When the fiber measuring mode is selected from the input section 1, the processing section 9 outputs control signal S1 indicating the emission of a light pulse to the timing generator section 2.

Being triggered by timing signal S2 from the timing generator section 2, the light pulse emitting section 3 emits a light pulse via the branch section 4 to the fiber 11 to be measured.

The light pulse emitting section 3 emits the light pulse repeatedly in the period corresponding to the length of the fiber 11, that is, in the period T longer than time t required for the reflected light to come back the total length of the fiber 11 since the supply of the light pulse to the fiber 11.

The reflected light returning from the fiber 11 as a result of the supply of the light pulse is allowed to incident on the photo-detecting section 5 via the branch section 4. Then, the photo-detecting section 5 converts the light into electricity.

The photoelectrically converted signal is amplified by the direct-current amplifying section 7 and is converted by the A/D converter section 8 into a digital signal. The digital signal is then inputted to the processing section 9.

The processing section 9 performs the process of logarithmically converting the inputted digital signal by sampling the data.

On the basis of the result of the signal processing, the waveform is displayed on the display section 10.

In the above operation, offset compensation in the fiber measuring mode is made as in the prior art.

Specifically, a light pulse is thrown to the fiber 11 in each period T (e.g., at intervals of one msec).

Of an N number of (e.g., 5000) data items sampled during one period T, the average value of an M number of (e.g., 20) data items not containing the reflected light from the fiber 11 is determined to be the offset level. Then, offset compensation is made by subtracting the offset level from the N number of data items sampled.

Figure 1B:
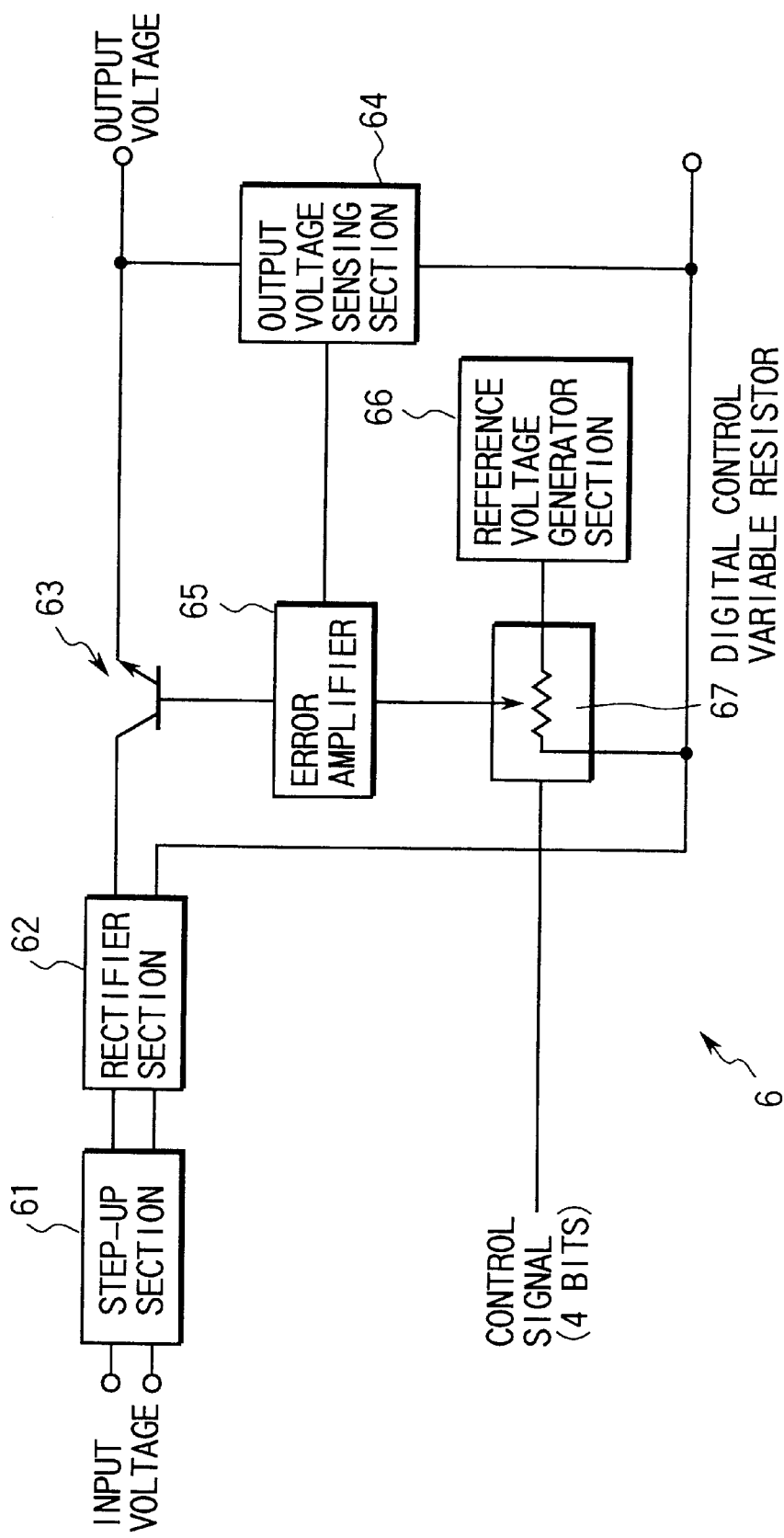
FIG. 1B is a detailed diagram of the bias section in the light measuring device in the first embodiment.

FIG. 1B is a detailed diagram of the bias section 6 in the light measuring device according to the first embodiment.

In FIG. 1B, a step-up section 61 raises an input direct-current voltage (+5 VDC) from the input terminal (IN) to an alternating-current voltage (140 VAC) and supplies the alternating-current voltage to a rectifier section 62.

The rectifier section 62 full-wave rectifies the alternating-current voltage (140 VAC) and supplies the rectified voltage to the collector of a transistor 63.

The emitter of the transistor 63 is connected to a voltage output terminal (OUT) serving as the bias section 6.

An output voltage sensing section 64 divides the output voltage at the voltage output terminal (OUT) and outputs the divided voltage to an error amplifier 65.

The error amplifier 65 compares the output from the output voltage sensing section 64 with a reference voltage (2.5 VDC) from a reference voltage generator section 66 and controls the base of the transistor 63 so that the difference between the output and the reference voltage may be kept constant.

At that time, the reference voltage from the reference voltage generator section 66 is set variably by a digital control variable resistor 67.

The digital control variable resistor 67 is controlled by, for example, a 4-bit control signal from the processing section 9.

As described above, a specific reverse bias voltage can be applied to the photo-detecting section 5 by causing the digital control variable resistor 67 to set the reference voltage from the reference voltage generator section 66 variably.

Figure 5:
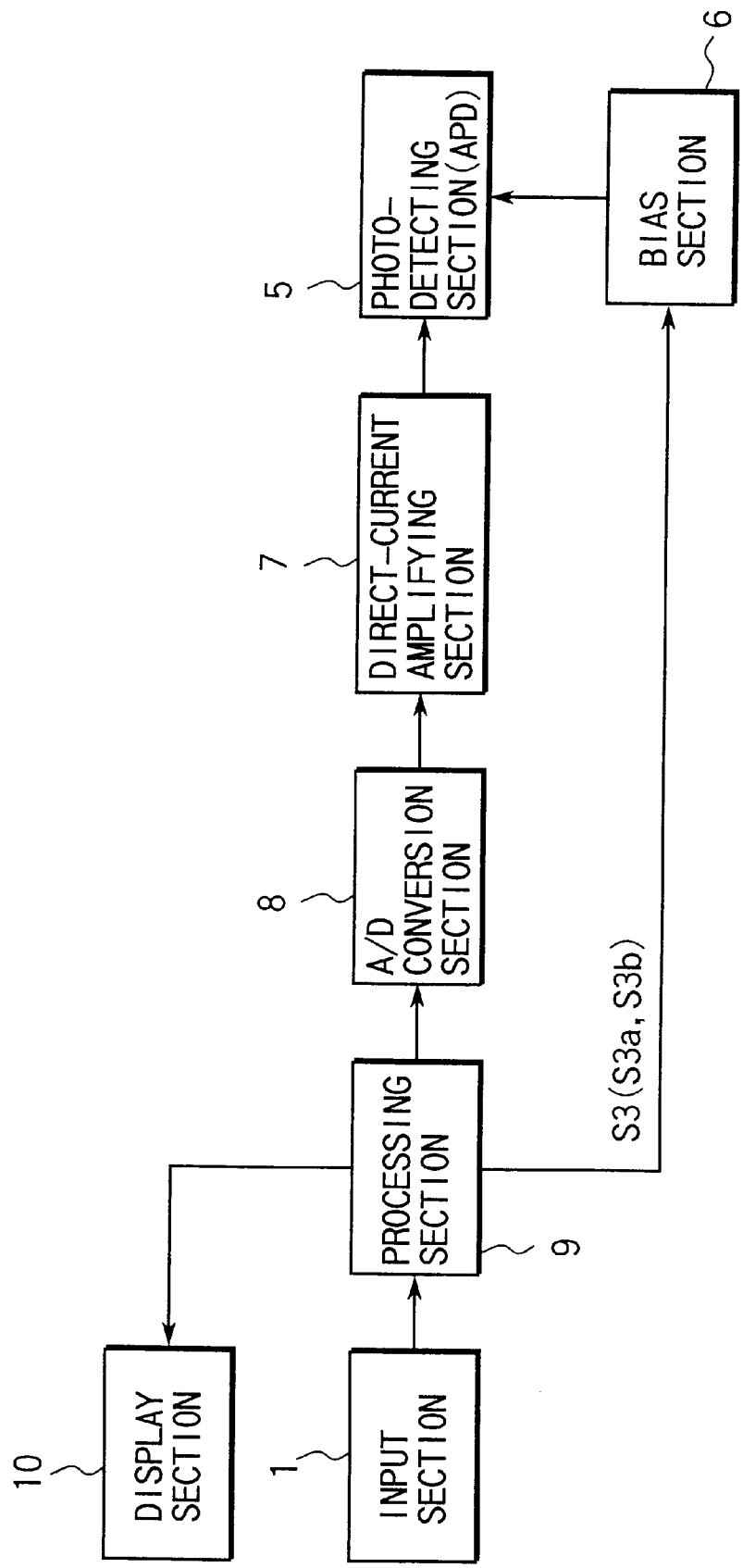
FIG. 5 is a block diagram of a light measuring device according to a second embodiment of the present invention.
Figure 6:
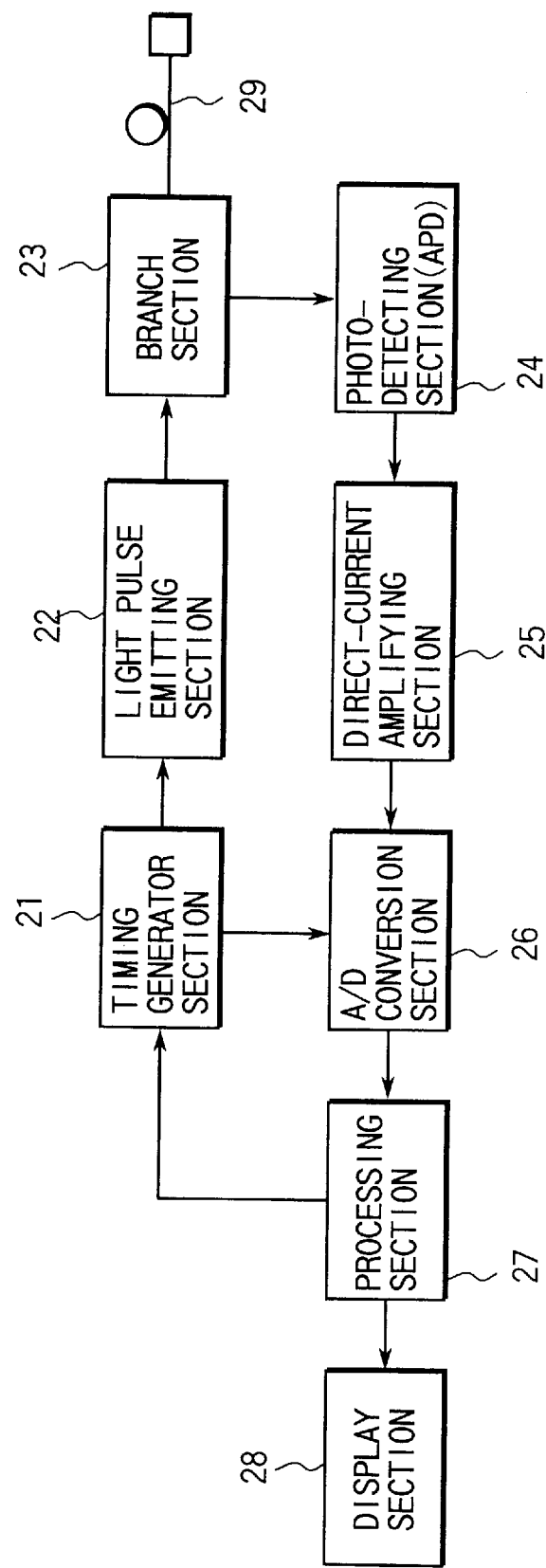
FIG. 6 is a block diagram of an OTDR taken as an example of a conventional light measuring device.

FIG. 5 is a block diagram of a light measuring device according to a second embodiment of the present invention.

The light measuring device of the second embodiment is constructed by eliminating the timing generator section 2, light pulse emitting section 3, and branch section 4 from the light measuring device of the first embodiment.

In other words, the light measuring device of the second embodiment is the same as that of the first embodiment except that the fiber measuring mode is absent.

With this configuration, the optical power level measuring mode in the first embodiment can be set when the power supply is turned on.

Therefore, just turning on the power supply enables the optical power level subjected to automatic offset compensation to be measured.

In the first embodiment, the signal at the time when the optical power level measuring mode is chosen has been used as a trigger signal. In the second embodiment, the signal at the time when the power switch is turned on has been used as a trigger signal. With these trigger signals, the offset data has been acquired at intervals of time T0 while the optical power level measuring mode or the power switch is on.

The input section 1 may be provided with a separate key to select the offset mode. Then, the processing section 9 may be allowed to output an offset compensation instruction or a measurement instruction to the bias section 6, depending on whether the signal at the time when the offset mode is chosen is present or absent, which provides variable control of the reverse bias voltage applied to the photo-detecting section 5.

This enables the necessary offset compensation to be made according to changes in the environment through only a key operation on the input section 1.

As described above, with the present invention, it is possible to reduce the laborious task of shading light before measurement as found in conventional power meters, make the necessary offset compensation for optical power level measurement automatically with a simple configuration, and achieve highly-accurate measurements.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

We claim:

1. A light measuring device comprising:
    a photo-detecting section whose output current varies according to an applied reverse bias voltage and which receives light from a measured object and outputs a current proportional to the intensity of the light;
    a bias section which generates a first reverse voltage to prevent the output current of said photo-detecting section from flowing and a second reverse bias voltage to allow the output current of said photo-detecting section to flow and applies the first reverse bias voltage and the second reverse bias voltage to said photo-detecting section;
    a direct-current amplifying section which outputs a signal whose level is proportional to the output current from said photo-detecting section; and
    a processing section which determines the intensity of light from said measured object from a first output from said direct-current amplifying section when said bias section is controlled so that said first reverse bias voltage may be applied to said photo-detecting section and a second output from said direct-current amplifying section when said bias section is controlled so that said second reverse bias voltage may be applied to said photo-detecting section.

2. A light measuring device according to claim 1, wherein said bias section applies said first reverse bias voltage to said photo-detecting section to make the current multiplication factor of said photo-detecting section almost zero to prevent the output current of said photo-detecting section from flowing and also applies said second reverse bias voltage to said photo-detecting section to make the current multiplication factor of said photo-detecting section one or more to allow the output current of said photo-detecting section to flow for measurement of the intensity of light from said measured object.

3. A light measuring device according to claim 1, wherein said photo-detecting section includes an InGaAs APD (Avalanche Photodiode).

4. A light measuring device according to claim 3, wherein said first reverse bias voltage said bias section applies to said photo-detecting section is in the range from 0 V or higher to 13 V or lower and said second reverse bias voltage is in the range from 16 V or higher to 100 V or lower.

5. A light measuring device according to claim 1, wherein said processing section, when receiving an instruction to determine the intensity of light from said measured object, causes said bias section to apply said first reverse bias voltage to said photo-detecting section during a first specific period for offset data acquisition, receives said first output from said direct-current amplifying section, and stores it as offset data, and after said specific period has elapsed, causes said bias section to apply said second reverse bias voltage to said photo-detecting section during a second specific period for determining the intensity of light from said measured object, receives said second output from said direct-current amplifying section, and determines the intensity of light from said measured object by subtracting said offset data, more than once during said second specific period.

* * * * *